(No Model.)

J. A. McCLELLAN.
CONDENSER AND DRIPPER FOR COFFEE OR TEA POTS.

No. 515,008. Patented Feb. 20, 1894.

Witnesses:
N. D. Lewis
W. T. Howell

Inventor:
John A. McClellan
By Geo. Schubert
Attorney

UNITED STATES PATENT OFFICE.

JOHN A. McCLELLAN, OF WALNUT SPRINGS, TEXAS.

CONDENSER AND DRIPPER FOR COFFEE OR TEA POTS.

SPECIFICATION forming part of Letters Patent No. 515,008, dated February 20, 1894.

Application filed May 6, 1893. Serial No. 473,196. (No model.)

*To all whom it may concern:*

Be it known that I, JOHN A. MCCLELLAN, a citizen of the United States, residing at Walnut Springs, in the county of Bosque and State of Texas, have invented certain new and useful Improvements in Condensers and Drippers for Coffee or Tea Pots; and I do hereby declare the following to be a full, clear, and exact description of the invention, such as will enable others skilled in the art to which it appertains to make and use the same, reference being had to the accompanying drawings, forming part of this specification, in which drawings—

Figure 1:
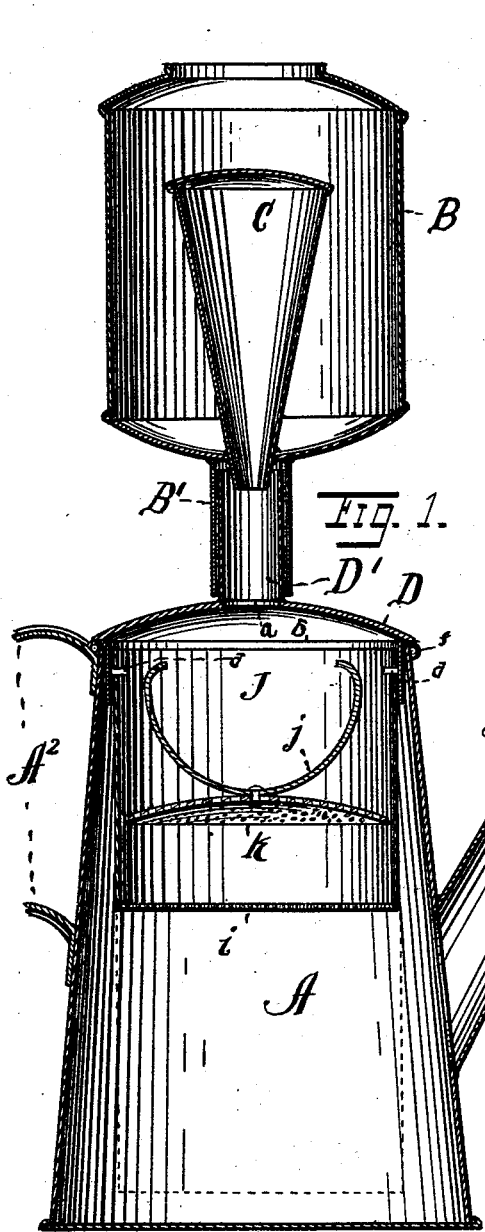
Figure 2:
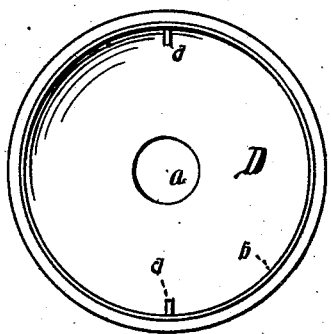
Figure 3:
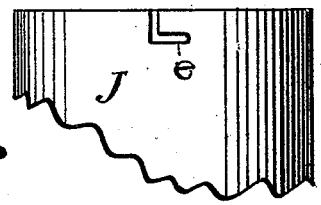
Figure 4:
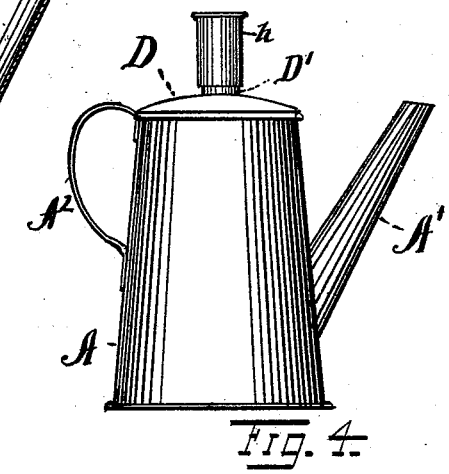

Figure 1 is a vertical section view of my invention as used in connection with coffee and tea pots. Fig. 2 is a bottom plan view of the lid of the pot adapted for my invention. Fig. 3 shows a partial side view of the dripper; and Fig. 4 is a reduced view of the pot as used on the table with the condenser removed.

Similar letters refer to similar parts throughout the several views.

My invention has relation to a combined condenser and dripper for coffee or tea pots, the main object of the invention being the provision of a combined condenser and dripper to be attached to and used in connection with an ordinary coffee or tea pot; second, to construct a condenser readily connected to or disconnected from the lid of coffee or tea pot, and to have the reservoir or body of the condenser a proper distance above the pot to prevent its receiving external heat from the pot; and thereby, to produce such condenser and dripper at a minimum cost; and perfect in its operation.

In the drawings, A designates the coffee or tea pot as in common use provided with the handle $A^2$, and spout $A'$.

D designates the usual lid having the rim $b$.

$a$ designates a perforation in the center of the lid D.

$D'$ is a tube of about one and one-half inches in length and soldered over the perforation $a$.

B designates a cold water reservoir, preferably formed, (or made,) of zinc; as it is a non-conductor of heat, (though any other sheet metal may be used,) with its upper end open as shown.

C designates the condenser formed as an inverted frustum having its upper end closed, and extending to within one inch of the upper end of the reservoir B; and with its lower end extending for near a half inch through a perforation in the lower end of the reservoir B, and rigidly soldered therein; the lower end of the condenser C is left open for the steam to enter and the water to escape.

$B'$ is a tube soldered to the lower end of the condenser B, encircling the lower end of the condenser C, and of proper size to fit firmly over the tube $D'$ to hold the reservoir B in position, and to form the necessary joint between the pot A and the condenser C.

$h$ designates a cap of proper size to fit over the end of the spout $A'$. to prevent the steam from escaping through said spout; said cap $h$ fits also over the tube $D'$ and is used on said tube $D'$ when the pot A is ready for the table.

J designates a dripper to receive the ground coffee or tea; said dripper can be extended down to near the bottom of the pot as shown in dotted lines in Fig. 1 and the coffee or tea boiled as usual when so desired.

K is a perforated lid to rest on the grounds.

$j$ designates a bail secured to the lid K and answering as a guide to prevent the lid K from tilting and also as a bail by which the said lid K can be removed, the upper edge of the dripper J is provided with two L slots $e$ as shown in Fig. 3; and in the downward projecting rim $b$ of the lid D are corresponding studs, $d$ to enter said L slots by which the dripper J. is readily secured in the lid D.

To use this condenser and dripper, the coffee or tea is placed in the dripper. The dripper is then slipped into the rim of the lid as heretofore described, the lid is now placed on the pot, with the dripper suspended within the pot; the cap is now placed on the spout of the pot to prevent the escape of the steam from the spout. The condenser is now placed on the tube $D'$ as shown in the drawings, the reservoir B is filled with cold water, and as the water in the pot becomes heated the steam rises and passing through the coffee or tea in the dripper, and enters the condenser by passing through the tube $D'$, and coming in contact with the cold surface of the condenser produced by the cold water which surrounds the condenser in the reservoir, the steam becomes chilled and is constantly condensing and dripping down through the dripper into the pot thereby holding the strength and aroma of the coffee or tea, and gives the user a richer flavored drink at a less expense as no per cent. of the strength and flavor of the coffee or tea is destroyed.

Having thus described my invention, what I claim is—

The combination with a coffee pot, having a lid, provided with a perforation, a tube D' secured over said perforation, a condenser within a reservoir, a tube B' secured to the lower end of the reservoir, substantially as and for the purpose described.

In testimony whereof I have affixed my signature in presence of two witnesses.

JOHN A. McCLELLAN.

Witnesses:
 N. D. LEWIS,
 W. T. HOWELL.